(12) United States Patent
Key

(10) Patent No.: US 8,221,082 B2
(45) Date of Patent: Jul. 17, 2012

(54) REINFORCED IMPELLER AND METHOD

(75) Inventor: Tony E. Key, LaPorte, IN (US)

(73) Assignee: New York Blower Company, Willowbrook, IL (US)

( * ) Notice: Subject to any disclaimer, the term of this patent is extended or adjusted under 35 U.S.C. 154(b) by 1114 days.

(21) Appl. No.: 12/059,128

(22) Filed: Mar. 31, 2008

(65) Prior Publication Data

US 2009/0246026 A1 Oct. 1, 2009

(51) Int. Cl.
*F04D 29/30* (2006.01)
(52) U.S. Cl. ............ 416/196 R; 416/186 R; 29/889.4
(58) Field of Classification Search ............ 416/186 R, 416/196 R
See application file for complete search history.

(56) References Cited

U.S. PATENT DOCUMENTS

| | | | | |
|---|---|---|---|---|
| 4,074,953 A | * | 2/1978 | Budde et al. | 416/183 |
| 4,834,612 A | * | 5/1989 | Lahn et al. | 415/119 |
| 5,829,956 A | * | 11/1998 | Chen et al. | 416/196 A |
| 7,905,708 B2 | * | 3/2011 | Fan et al. | 416/178 |

* cited by examiner

*Primary Examiner* — Ninh H Nguyen
(74) *Attorney, Agent, or Firm* — Edwards Wildman Palmer LLP

(57) ABSTRACT

An impeller is provided having a first plate, a second plate, a plurality of blades being positioned between and connected to the first and second plates, and at least one brace member having first and second planes positioned between and connected to two blades such that the brace extends generally perpendicular from the first blade and extends from the second blade at an angle.

13 Claims, 5 Drawing Sheets

REINFORCED IMPELLER AND METHOD

FIELD OF THE INVENTION

The present invention relates to impellers and more particularly to impellers of centrifugal fans for commercial and industrial use.

BACKGROUND OF THE INVENTION

Centrifugal fans are used in a wide range of applications from commercial building ventilation to industrial dust-collection systems. The fan wheel, or impeller, can come in different designs depending on the chosen application. Conventional impellers can comprise a front plate, a back plate, and a plurality of blades positioned between and connected to the front and back plates. The impeller is operatively associated with a conventional driving means which rotates the impeller thereby creating centrifugal force in an radial direction relative to the impellers axis of rotation. Air enters through a side of the impeller and exits the impeller in the direction of the centrifugal force. In some impellers, the blades tend to be thicker and heavier than blades of other impeller designs, and can therefore be used in heavier duty applications in which the air being moved contains contaminants that can damage lighter weight impeller blades. Such impellers may include brace plates which are positioned between and connected to the blades. During operation, the blades have a tendency to flex in the direction of centrifugal force. The brace plates prevent the blades from flexing, which in turn causes the brace plates to flex in a direction generally perpendicular to the direction of centrifugal force and creating stress in the brace plate. Disadvantageously, high duty cycling and operation at higher temperatures have, at times, resulted in fatigue cracking in the brace plates.

It would be highly desirable to provide an impeller that has heavy blades for use in applications with airborne contaminants, and that can also resist the stresses from high duty cycling that conventional impellers fail under while also providing satisfactory air performance capabilities thereby increasing the life cycle of the impeller.

SUMMARY

An impeller is provided having a first plate, a second plate, a plurality of blades being positioned between and connected to the first and second plates, and at least one brace member having first and second planes positioned between and connected to two blades such that the brace extends generally perpendicular from the first blade and extends from the second blade at an angle.

DETAILED DESCRIPTION

Figure 1:
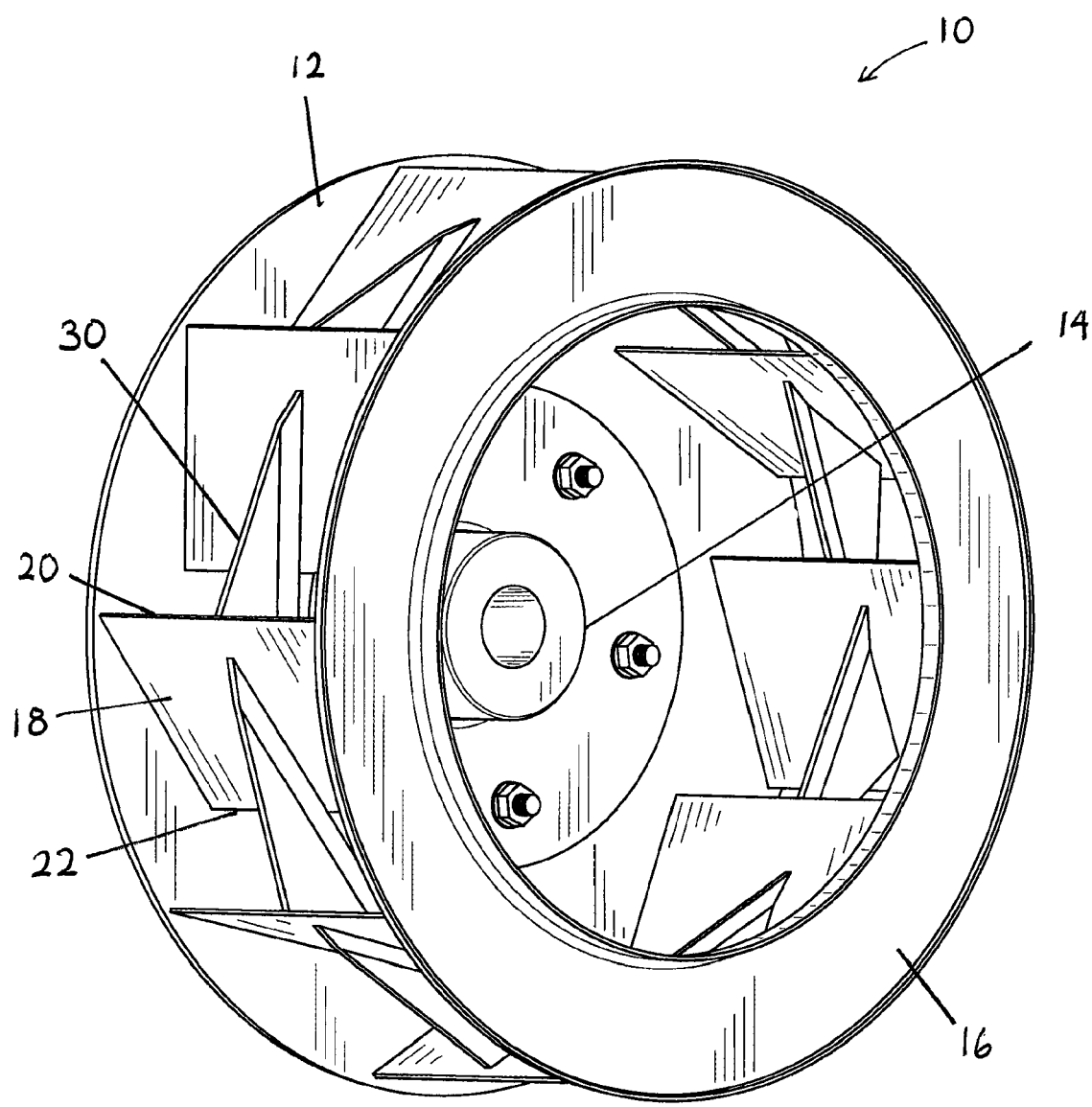
FIG. 1 is a perspective view of an embodiment of an impeller.
Figure 2:
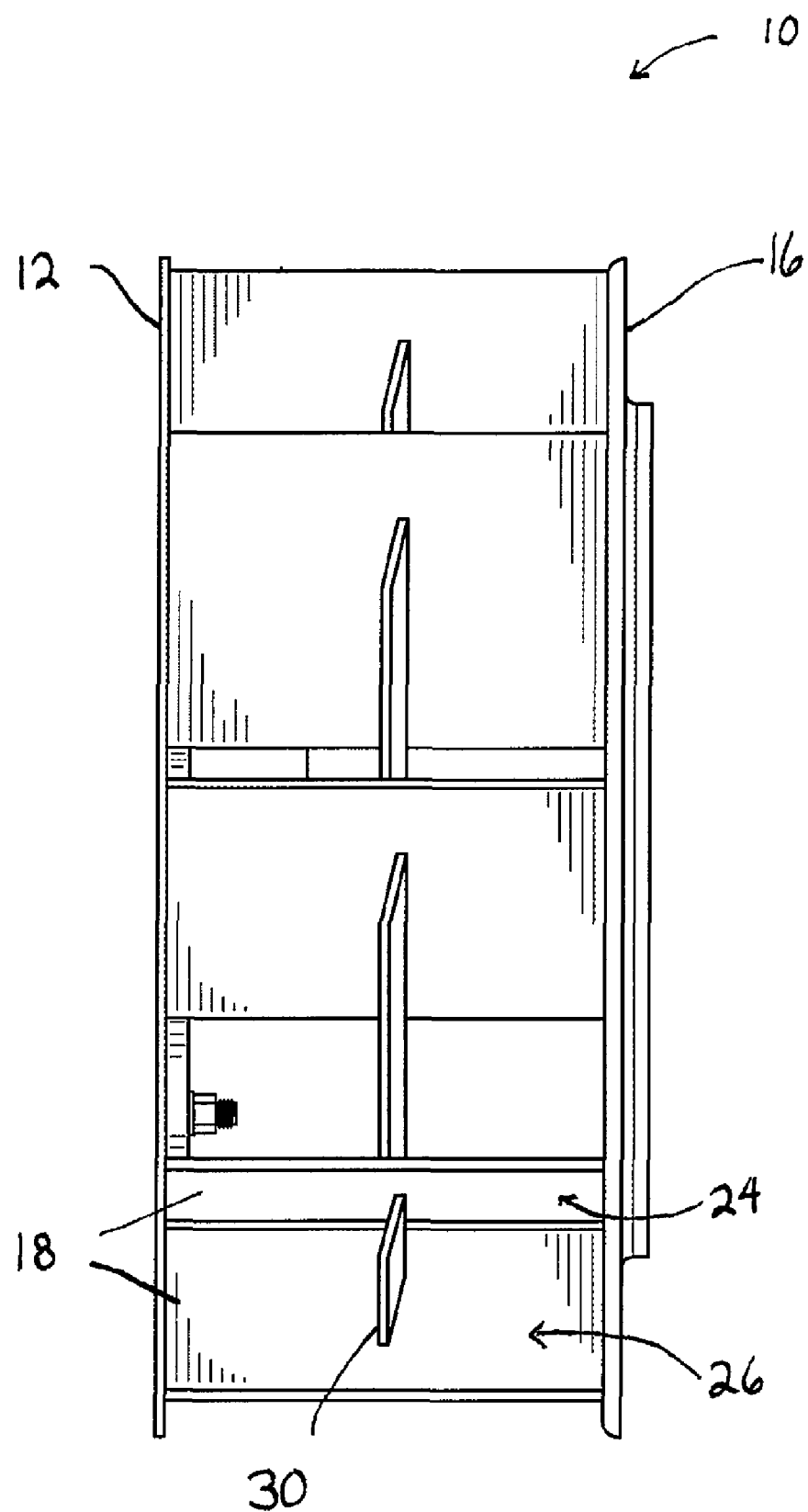
FIG. 2 is a side view of the impeller of FIG. 1.

FIG. 1 illustrates a perspective view of an impeller, generally designated 10. In this example, impeller 10 includes a generally circular back plate 12 having a tubular hub 14 at its center extending axially from the back plate 12. The hub 14 is adapted to be attached to and operatively associated with a driving means (not shown). Impeller 10 also includes a generally annular front plate 16 and blades 18. Blades 18 of the example impeller 10 are generally flat and rectangular in shape and are attached at one side to back plate 12 and at the opposite side to front plate 16. Blades 18 are connected to back plate 12 and front plate 16 by conventional means such as welding and extend generally perpendicular to back plate 12 and front plate 16. Blades 18 include a first end 20 and a second end 22. Blades 18 are spaced apart and may be spaced equidistant from one another. In this example, blades 18 are inclined relative to the direction of rotation of the impeller 10 such that the first end 20 of each blade 18 is disposed further from the center of back plate 12 than the second end 22. Blades 18 also include an outer surface 24 and an inner surface 26 as shown in FIGS. 2-4.

Figure 6:
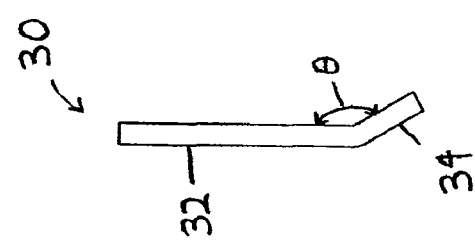
FIG. 6 is a side view of an embodiment of the brace of FIG. 5.
Figure 5:
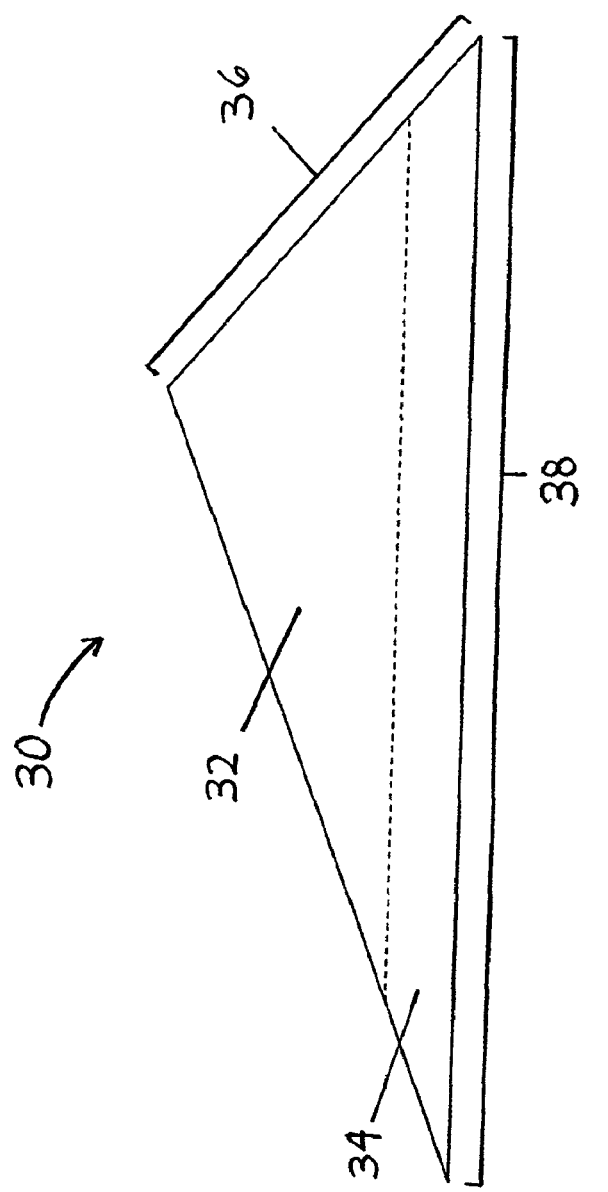
FIG. 5 is a front view of an embodiment of a brace.

The impeller 10 also includes braces 30 disposed between and connected to blades 18. FIGS. 5 and 6 illustrate an example of a brace 30. In this example, braces 30 are generally triangular in shape and include a first plane 32 and a second plane 34 which are at an angle θ relative to each other. For instance, angle θ may be in the range of approximately 140 degrees to 160 degrees. In one example, the angle θ may selectively be 150 degrees. It is understood that angle θ could fall outside the range of 140 degrees to 160 degrees, although the brace 30 has been found to be most effective within this range. The first plane 32 has an edge 36 and the second plane 34 has an edge 38. The angle between first plane 32 and second plane 34 may be created by any conventional means such as bending brace 30, welding two pieces together to form brace 30 or any other known method.

Figure 3:
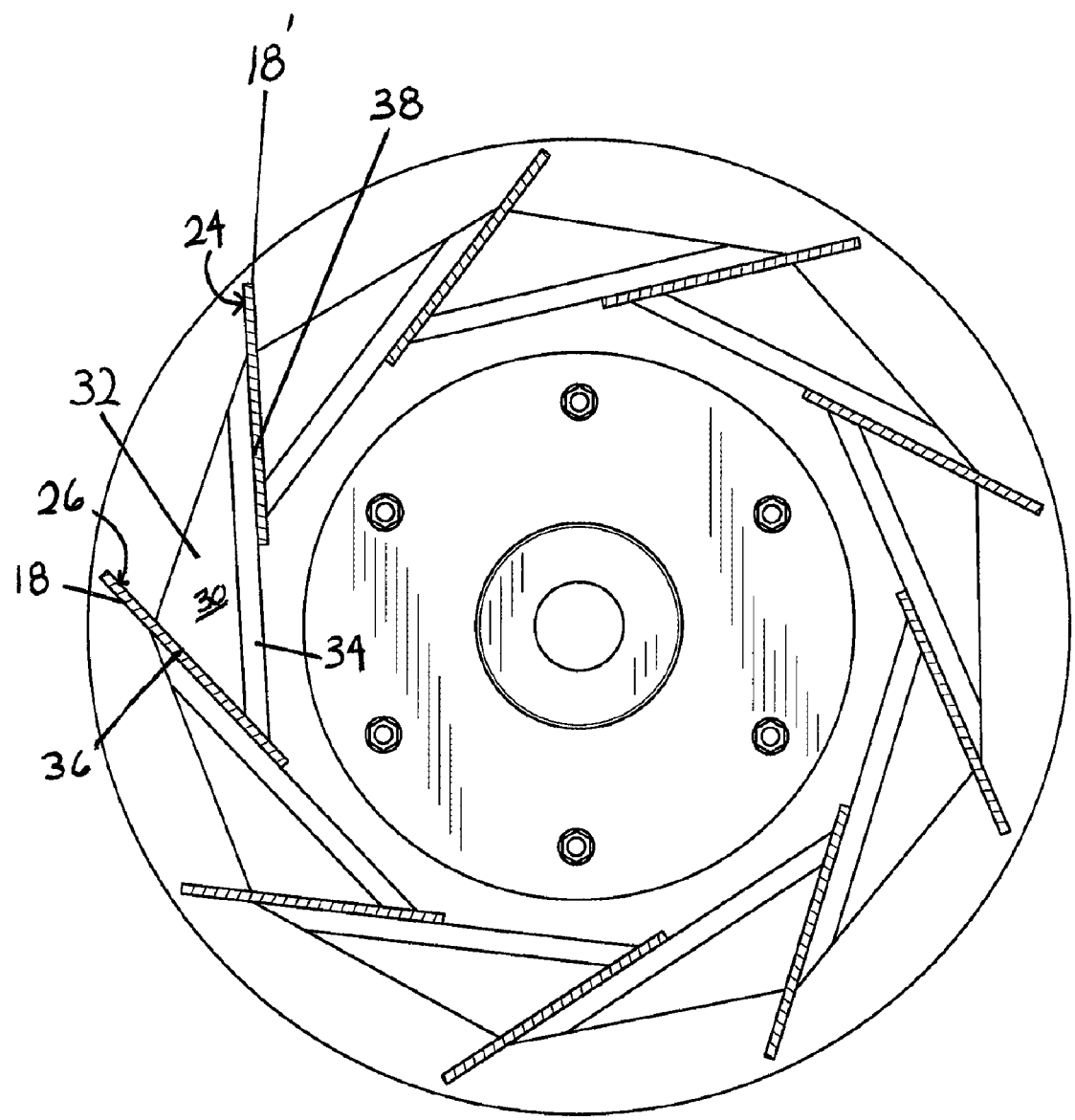
FIG. 3 is a sectional front view of the impeller of FIG. 1.
Figure 4:
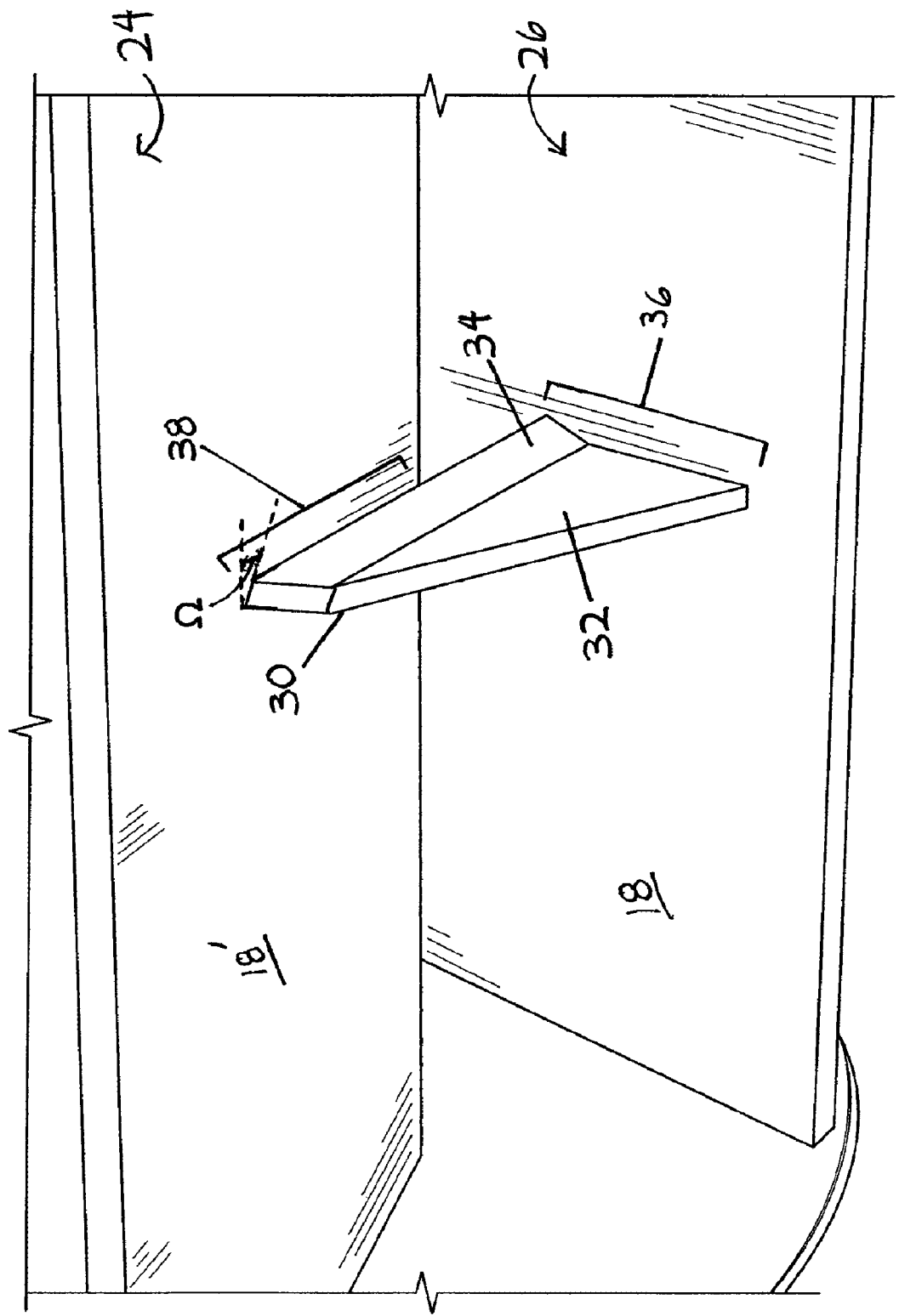
FIG. 4 is an enlarged view of two blades and a brace of the impeller of FIG. 1.

As shown in FIGS. 3 and 4, in this example, each brace 30 is positioned between and connected to a first and second of the blades 18, 18' such that the edge 36 of the first plane 32 is flat against the inner surface 26 of the first blade 18 and brace 30 extends straight out from the inner surface 26 of the first blade 18 such that the first plane 32 is generally perpendicular to both the inner surface 26 of the first blade 18 and the outer surface 24 of the second blade 18', while the edge 38 of the second plane 34 is at an angle Ω relative to the outer surface 24 of a second blade 18'. For instance, angle Ω may be in the range of approximately 20 degrees to 40 degrees. In one example, the angle Ω may selectively be 30 degrees. It is understood that angle Ω could fall outside the range of 20 degrees to 40 degrees, although the brace 30 has been found to be most effective within this range. Braces 30 may be connected to blades 18, 18' by conventional means such as welding.

During operation, impeller 10 is caused to be rotated by conventional driving means, and centrifugal force is created by the rotation of the impeller 10. The direction of the centrifugal force is generally radial relative to the axis of rotation of the impeller 10. Without braces 30, the centrifugal force would act upon blades 18 and would cause blades 18 to bend or flex in the direction of the centrifugal force. Braces 30 serve to prevent or reduce blades 18 from bending or flexing in the direction of the centrifugal force, thereby creating a force on the braces 30 in a direction generally perpendicular to the direction of the centrifugal force. The design of brace 30 including the first plane 32 and the second plane 34 at an angle relative to one another advantageously provides a greater resistance to the stresses caused by the force on the braces 30.

Use of braces 30 results in greater overall resistance to the centrifugal force which caused blades to flex and braces to crack in conventional impeller designs. A finite element analysis utilizing computer simulation comparing an impeller design of the example set forth above and a conventional impeller having standard braces showed that the impeller design of the example set forth above had a 23% reduction in stress in the braces when compared to the conventional impeller at the same rotational velocity. With that reduction in stress, an impeller can provide higher cycling capabilities.

The foregoing description of the preferred embodiment of the invention has been presented for purposes of illustration and description, and is not intended to be exhaustive or to limit the invention to the precise form disclosed. The description was selected to best explain the principles of the invention and its practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. An impeller comprising:
   a first plate and a second plate;
   a plurality of blades being positioned between and connected to the first and second plates, individual blades in the plurality of blades having an inner surface and an outer surface; and
   at least one brace member having a first plane having a first edge and a second plane having a second edge, at least a portion of the first edge being connected to the inner surface of a first blade of the plurality of blades such that the first plane is generally perpendicular to both the inner surface of the first blade and the outer surface of the second blade, and at least a portion of the second edge being connected to the outer surface of a second blade of the plurality of blades such that the second plane is at a non-perpendicular angle with the outer of the second blade wherein the non-perpendicular angle is an angle within the range of 20 degrees to 40 degrees.

2. The impeller of claim 1 wherein the plurality of blades are positioned at an angle relative to an axis of rotation of the impeller.

3. The impeller of claim 1 wherein the plurality of blades are spaced apart equidistantly from one another.

4. The impeller of claim 1 further comprising one brace member between each blade in the plurality of blades.

5. The impeller of claim 1 wherein the plurality of blades are generally flat.

6. An impeller comprising:
   a first plate and a second plate;
   a plurality of blades being positioned between and connected to the first and second plates, individual blades in the plurality of blades having an inner surface and an outer surface; and
   at least one brace member having a first plane having a first edge and a second plane having a second edge, at least a portion of the first edge being connected to the inner surface of a first blade of the plurality of blades such that the first plane is generally perpendicular to both the inner surface of the first blade and an outer surface of the second blade, and at least a portion of the second edge being connected to the outer surface of a second blade of the plurality of blades such that the second plane is at a non-perpendicular angle with the outer surface of the second blade wherein the non-perpendicular angle is 30 degrees.

7. An impeller comprising:
   a first plate and a second plate;
   a plurality of blades being positioned between and connected to the first and second plates, individual blades in the plurality of blades having an inner surface and an outer surface;
   and
   at least one brace member, wherein the at least one brace is generally triangular, and wherein having a first plane having a first edge and a second plane having a second edge, at least a portion of the first edge being connected to the inner surface of a first blade of the plurality of blades and at least a portion of the second edge being connected to the outer surface of a second blade of the plurality of blades.

8. An impeller comprising:
   a first plate and a second plate;
   a plurality of blades being positioned between and connected to the first and second plates, individual blades in the plurality of blades having an inner surface and an outer surface;
   and
   at least one brace member having a first plane having a first edge and a second plane having a second edge, wherein the first plane and the second plane form an angle therebetween within the range of 140 degrees and 160 degrees, at least a portion of the first edge being connected to the inner surface of a first blade of the plurality of blades and at least a portion of the second edge being connected to the outer surface of a second blade of the plurality of blades.

9. The impeller of claim 8 wherein the angle between the first and second plane is 150 degrees.

10. A method of making an impeller comprising:
    providing a first plate and a second plate;
    providing a plurality of blades, each of the blades of the plurality of blades having an inner surface and an outer surface;
    connecting one end of each of the blades of the plurality of blades to the first plate and connecting another opposite end of each of the blades of the plurality of blades to the second plate;
    providing at least one brace member having a first plane having a first edge and a second plane having a second edge; and
    connecting the at least one brace member to a first blade and a second blade of the plurality of blades such that at least a portion of the first edge is connected to the inner surface of a first blade of the plurality of blades such that the first plane is generally perpendicular to both the inner surface of the first blade and the outer surface of the second blade, and at least a portion of the second edge is connected to the outer surface of a second blade of the plurality of blades such that the second plane is at a non-perpendicular angle within the range of 20 to 40 degrees with the outer surface of the second blade.

11. The method of claim 10 wherein the non-perpendicular angle is 30 degrees.

12. A method of making an impeller comprising:
    providing a first plate and a second plate;
    providing a plurality of blades, each of the blades of the plurality of blades having an inner surface and an outer surface;
    connecting one end of each of the blades of the plurality of blades to the first plate and connecting another opposite end of each of the blades of the plurality of blades to the second plate;
    providing at least one brace member having a first plane having a first edge and a second plane having a second edge wherein the first plane and the second plane form an angle within the range of 140 degrees and 160 degrees therebetween; and connecting the at least one brace member to a first blade and a second blade of the plurality of blades such that at least a portion of the first edge is connected to the inner surface of a first blade of the plurality of blades, and at least a portion of the second edge is connected to the outer surface of a second blade of the plurality of blades.

13. The method of claim 12 wherein the angle between the first and second plane is 150 degrees.

* * * * *